(12) United States Patent
Owen et al.

(10) Patent No.: US 8,308,225 B2
(45) Date of Patent: Nov. 13, 2012

(54) AUTOMOTIVE FRONT SUPPORT BEAM, FRONT CARRIER, AND A METHOD OF ASSEMBLY

(75) Inventors: Michael Owen, Sterling Hts, MI (US); David I. Allott, Sterling Hts, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 393 days.

(21) Appl. No.: 12/541,377

(22) Filed: Aug. 14, 2009

(65) Prior Publication Data

US 2011/0037292 A1 Feb. 17, 2011

(51) Int. Cl.
B62D 25/08 (2006.01)
(52) U.S. Cl. ............... 296/193.09; 296/203.02
(58) Field of Classification Search ............ 296/193.09, 296/203.02, 187.09; 180/68.4
See application file for complete search history.

(56) References Cited

U.S. PATENT DOCUMENTS

| | | | |
|---|---|---|---|
| 4,454,944 A | 6/1984 | Shillington et al. | |
| 4,502,606 A | 3/1985 | Shillington et al. | |
| 4,600,112 A | 7/1986 | Shillington et al. | |
| 4,667,821 A | 5/1987 | Shillington | |
| D292,777 S | 11/1987 | Shillington et al. | |
| 4,984,686 A | 1/1991 | Shillington | |
| 5,024,327 A | 6/1991 | Shillington | |
| 6,189,958 B1 * | 2/2001 | Guyomard et al. | 296/193.09 |
| 6,273,496 B1 * | 8/2001 | Guyomard et al. | 296/193.09 |
| 6,412,855 B1 * | 7/2002 | Cantineau et al. | 296/187.01 |
| 6,421,979 B1 * | 7/2002 | Fischer et al. | 52/745.19 |
| 6,517,146 B1 * | 2/2003 | Cheron et al. | 296/193.09 |
| 6,547,317 B1 * | 4/2003 | Cheron et al. | 296/193.01 |
| 6,948,769 B2 * | 9/2005 | Borkowski et al. | 296/203.02 |
| 7,008,008 B2 | 3/2006 | Andre et al. | |
| 7,182,545 B2 * | 2/2007 | Riviere et al. | 403/267 |
| 7,185,946 B2 * | 3/2007 | Cate et al. | 296/193.09 |
| 7,325,863 B2 * | 2/2008 | Uchiyama | 296/193.09 |
| 7,331,413 B2 * | 2/2008 | Okai et al. | 180/68.4 |
| 7,419,208 B2 * | 9/2008 | Sub | 296/193.09 |
| 7,571,957 B2 * | 8/2009 | Povinelli et al. | 296/193.09 |
| 7,644,966 B2 * | 1/2010 | Huber et al. | 293/155 |
| 7,845,714 B2 * | 12/2010 | Fischer et al. | 296/193.09 |
| 7,914,071 B2 * | 3/2011 | Saitou et al. | 296/193.09 |
| 2003/0001410 A1 * | 1/2003 | Cate et al. | 296/187 |
| 2004/0160088 A1 | 8/2004 | Staargaard et al. | |
| 2004/0262954 A1 | 12/2004 | Scheib et al. | |
| 2005/0035609 A1 * | 2/2005 | Cate et al. | 293/120 |
| 2009/0140552 A1 * | 6/2009 | Kang | 296/193.09 |
| 2011/0037292 A1 * | 2/2011 | Owen et al. | 296/193.09 |

FOREIGN PATENT DOCUMENTS

| | | |
|---|---|---|
| DE | 19946349 A1 | 3/2001 |
| WO | 2008074516 A1 | 6/2008 |

* cited by examiner

Primary Examiner — Glenn Dayoan
Assistant Examiner — Gregory Blankenship
(74) Attorney, Agent, or Firm — Matthew B. Dernier, Esq.; Gibson & Dernier LLP

(57) ABSTRACT

An automotive front support beam for use in an automotive front carrier, wherein the automotive front support beam comprises a top piece and a bottom piece, wherein the top piece and the bottom piece are fastened together and enclose a hollow space and wherein the top piece and the bottom piece are molded.

9 Claims, 16 Drawing Sheets

AUTOMOTIVE FRONT SUPPORT BEAM, FRONT CARRIER, AND A METHOD OF ASSEMBLY

FIELD OF THE INVENTION

The invention relates to automotive front support beams, in particular to the construction of automotive front carriers from automotive front support beams.

BACKGROUND OF THE INVENTION

An automotive front carrier is a support structure mounted at the front of an automobile and is used to support components at the front of the automobile. For example components the front carrier may support are: the radiator, the head lamps, bumper beams, latch braces for the hood, hood prop rods, hood bumpers, crash sensors, washer bottles, the grill, air guides, air temperature sensors, pedestrian protection, air conditioning condensers, an charged air cooler, and energy absorbers.

Automotive front carriers can be constructed from metal, however this leads to additional weight and reduces the fuel economy of the automobile. In injection molding has been used to manufacture front end carriers, however large injection molding machines (approx. 2700 tons) are necessary and expensive "end of arm" tooling is necessary for the loading and unloading of the part into the injection molding machine.

SUMMARY OF THE INVENTION

The invention provides for an automotive front support beam, an automotive front carrier, and a method of trend set assembling an automotive front carrier as disclosed and described herein.

Embodiments of the invention address the aforementioned problem and provide other advantages by molding the automotive front end carrier out of several pieces which are then assembled into the front end carrier. The automotive front end carrier may be constructed out of one or more automotive front support beams according to an embodiment of the invention. This allows the use of smaller injection molding presses, such as a 800 Ton machine. The use of smaller parts allows more detail to be molded into the parts which reduces the amount of finishing steps for the pieces. Advantages of the various embodiments are discussed in greater detail below.

The invention provides for an automotive front support beam for use in an automotive front carrier. An automotive front support beam is defined herein as a load bearing support used as a support structure for an automobile, in particular for constructing an automotive front carrier. The automotive front support beam comprises a top piece and a bottom piece. It is understood herein that the reference to a top piece and a bottom piece do not imply a preferred orientation, but are simply a way of differentiating the two pieces. The top piece and the bottom piece are fastened together and enclose a hollow space. The top piece and the bottom piece are molded. Embodiments of the automotive front support beam are advantageous, because the hollow space can be used to enclose support structures or to conceal such things as wire harnesses and water or washer bottles. The use of molded pieces allows mounting supports and structures to be included into the automotive front support beam during the manufacturing process.

In another embodiment, the hollow space is adapted for enclosing at least one support structure. This embodiment is advantageous, because it allow support structures to be placed within the hollow space and the support structures do not require as much finishing. For instance the support structures if they are metal will not need to be painted or if it is a pulltruded or an extruded stiffener, the ends of the stiffener will not need to be cut or finished. A pulltruded stiffener is defined herein as a fiber reinforced stiffener where the fibers are pulled through the die during manufacture. This is in contrast to an extruded stiffener, where the resin and fibers are pushed through the die. In a pulltruded stiffener is that the fibers have a alignment defined by how they are pulled through the die.

In another embodiment the support structure is any one of the following: a hydro-form support structure, a metal plate, an extruded stiffener, and a pulltruded stiffener. A hydro-form support structure is a metallic support structure which has been expanded to fill a predefined volume. A pulltruded stiffener is a glass or other fiber composite material where the fibers are oriented in a particular direction for strength. The inclusion of a hydro-form support structure is advantageous, because it can be designed such that it fills the hollow space of the automotive front support beam. Enclosing metal plates within the automotive front support beam is advantageous, because they will be surrounded by the molded structure and do not require as much finishing work or necessarily as much painting. Metal plates or structures that are exposed to the elements in an automobile, need to be painted and finished. During the process of shipping these to a manufacturer they can become scratched. Enclosing them within the molded pieces first eliminates the need to paint them, and it also eliminates the problems of the protective paint being damaged before installation. It is very advantageous to include an extruded or a pulltruded stiffener in the hollow space, because if the extruded or pulltruded stiffener is exposed then the ends of the extruded or pulltruded stiffener need to be trimmed. Enclosing them within the hollow space eliminates the need to trim them.

In another embodiment there is a snap-fit between the top piece and the bottom piece for fastening the top piece to the bottom piece. This is advantageous, because a snap-fit can be used to form strong and rigid connection to fasten the top piece to the bottom piece.

In another embodiment a snap-fit is formed by one of the top piece and the bottom piece having at least two paths and a stabilizing rim. The other of the top piece and the bottom piece has at least two openings and a stabilizing channel. The stabilizing rim is adapted to fill the stabilizing channel within a first predetermined tolerance. The number of tabs and the number of openings is identical. The openings are adapted for receiving the tabs. The tabs snap-fit into the openings. There is an inter-tab space between each of the at least two tabs. There are spacers next to the openings which are adapted to fill the inner space tabs to within a second predetermined tolerance when the snap-fit is formed. This embodiment is advantageous, because the support beams using this snap-fit are extremely rigid and well secured together. The first and second predetermined tolerances may have the same value or may be different.

In another embodiment the top piece is welded to the bottom piece. The exact technique of the welding depends upon how the top piece and the bottom piece have been manufactured. If they are made from a plastic or a fiber composite of some sort then the pieces can be welded together using techniques for welding plastic. For example hot gas welding, speed, speed tip welding, contact welding, hot plate welding, high-frequency welding, ultrasonic welding, and vibration or friction welding can be used to weld the top piece to the bottom piece. This embodiment is advantageous, because it can be used to trend set and adjust the exact dimensions of the automotive front support beam. Trend setting is defined herein as the process of adjusting the dimensions of a part to fit with other parts in a manufacturing process.

In another embodiment at least one of the top piece and the bottom piece is manufactured using direct long glass injection molding. This is a particularly advantageous embodiment, because the top piece and/or bottom piece can be manufactured such that there are long smooth regions. This allows the use of long glass fibers during the injection molding. This leads to stronger parts than would be possible if direct long glass injection molding were not used.

In another embodiment at least one of the top piece and the bottom piece is constructed from at least two sub-pieces. The two sub-pieces may be adapted for being joined together or they may simply be adapted for joining to the other corresponding piece of the front support beam. For instance if the top piece were made of two sub-pieces the two sub-pieces of the top piece could be adapted for joining together with themselves plus the bottom piece or they could be adapted such that they are only joined to the bottom piece. This is an advantageous embodiment, because it allows the final manufactured products to be more flexible. For instance they can be used for a trend setting assembly of the pieces. This allows the phasing between the mounting holes or structures to be adjusted.

In another embodiment, at least one of the top piece and the bottom piece has at least one of the following molded features; a molded mounting structure and an insert. A molded mounting structure is a molded structure on the surface of a top piece of a bottom piece which is used for mounting an automotive component. An insert is an object which is embedded in the molded structure and can be used for structural or for mounting purposes. An example of an insert would be a threaded rod, a nut or even a compression ring. This is advantageous, because by including these features during the molding process less finishing work is needed to make the parts ready for assembly.

In another embodiment the hollow space is adapted for enclosing at least one of the following: a wire harness, a washer bottle, a radiator expansion bottle, and an electrical connector. This embodiment is advantageous, because any one of these components can be incorporated into the hollow space.

In another aspect the invention provides for an automotive front carrier comprising at least one automotive front support beam according to an embodiment of the invention. An embodiment of such an automotive front carrier is advantageous, because the use of the molded front support beams allows more complicated structures to be made. Embodiments of such an automotive front carrier also have all of the advantages listed for embodiments of the automotive front support beam.

In another embodiment the automotive front carrier comprises a horizontal cross member. The horizontal cross member comprises an automotive front support beam according to an embodiment of the invention. A horizontal cross member is defined herein as a cross member which is oriented roughly horizontal and provides a structural support in an automotive front carrier. The construction of the horizontal cross member according to an embodiment of the invention is advantageous because the size of the injection molding press used to manufacture it can be smaller. This can reduce or eliminate the need for an expensive end of arm tooling which is used for loading and unloading parts into the injection molding press. The manufacture of the horizontal cross member in this fashion also allows more details to be included in the injection molding process.

In another embodiment the automotive front carrier comprises at least one vertical post. As used herein a vertical post is a vertical support structure which is attached to a horizontal cross member in an automotive front carrier. The at least one horizontal cross member comprises an automotive front support beam according to an embodiment of the invention. The advantages of the vertical post being constructed in this way are identical with the advantages for the previous embodiment of a horizontal cross member.

In another embodiment the bottom piece of a horizontal cross member has a protrusion. The top and bottom piece of the vertical post are adapted for enclosing the protrusion between the hollow space of the vertical post. The enclosing of the protrusion by the vertical post joins a horizontal cross member and the vertical post rigidly. This embodiment is advantageous, first because both the horizontal cross member and any of the vertical posts are manufactured using automotive front support beams according to an embodiment of the invention. In this case the automotive front carrier has been manufactured out of smaller pieces than if it was manufactured as a single piece. This has the advantage of being able to use a smaller injection molding press. The advantages of using a smaller injection molding press have been previously discussed.

In another embodiment the automotive front carrier comprises a horizontal cross member. The horizontal cross member comprises an automotive front support beam according to an embodiment of the invention. The top piece comprises a left top piece, a middle top piece, and a right top piece. The bottom piece comprises a left bottom piece and a right bottom piece. The left bottom piece and the right bottom piece are adapted for being fastened together. The left bottom piece and the right bottom piece are adapted to be slideably mounted before being fastened together for adjusting the bottom piece to a first predetermined width. The left top piece, the middle top piece, and the right top piece are adapted to be slideably mounted on the bottom piece before being fastened to the bottom piece for adjusting the top piece to a second predetermined width. The bottom piece forms a vertical support. The left bottom piece comprises a left vertical post. The right bottom piece comprises a right vertical post. This embodiment is very advantageous, because the dimensions of the automotive front carrier can be adjusted. This allows the automotive front carrier to be trend set assembled.

In another embodiment the automotive front carrier further comprises a cross member adapted for being fastened together with the left vertical post and the right vertical post. The left vertical post and the right vertical post are adapted to be slideably mounted to the cross member for adjusting the bottom piece to the first predetermined width. This embodiment is advantageous, because the cross member provides additional structural support to the automotive front carrier. In addition this embodiment can also be trend set assembled.

In another embodiment the automotive front carrier further comprises a left molded cross member and a right molded cross member. The left molded cross member is integrally formed with the left vertical post, the right molded cross member is integrally formed with the right vertical post. It is understood herein that the term integrally formed means that the two pieces form a single piece. The left molded cross member is adapted for being fastened together with the right molded cross member. The left molded cross member and the right molded cross member are adapted to be slideably mounted to each other for adjusting the bottom piece to the first predetermined width. This embodiment has similar advantages as the embodiment with the cross member.

In another aspect the invention provides for a method of trend set assembling an automotive front carrier according to an embodiment of the invention. The method comprises the step of locating the left bottom piece and the right bottom piece together. Locating is understood to mean herein as a process of mounting for the purpose of assembly. The method further comprises the step of adjusting the left bottom piece and the right bottom piece to the first predetermined width. The method further comprises the step of locating the left top piece, the middle top piece, and the right top piece together. The method further comprises the step of adjusting the left top piece, the middle top piece, and the right top piece to the second predetermined width. The method further comprises the step of fastening the right bottom piece to the left bottom piece and the method further comprises the step of fastening the left top piece, the middle top piece, and the right top piece to the bottom piece. It is understood that when the bottom piece is fastened to the left bottom piece they form the bottom piece. The order of fastening the right bottom piece to the left bottom piece and also to the left top piece, the middle top piece, and the right top piece to the bottom piece is not critical. The pieces can be joined together to form sub-assemblies or they can be all held together and then all fastened at the same time.

Other aspects, features, and advantages of the present invention will be apparent to one skilled in the art from the description herein taken in conjunction with the accompanying drawings.

BRIEF DESCRIPTION OF THE DRAWINGS

In the following preferred embodiments of the invention will be described, by way of examples only, and with reference to the drawings in which.

DETAILED DESCRIPTION

Like numbered elements in these figures are either identical elements or perform the same function. Elements which have been discussed previously will not necessarily be discussed in later figures if the function is equivalent.

Figure 1:
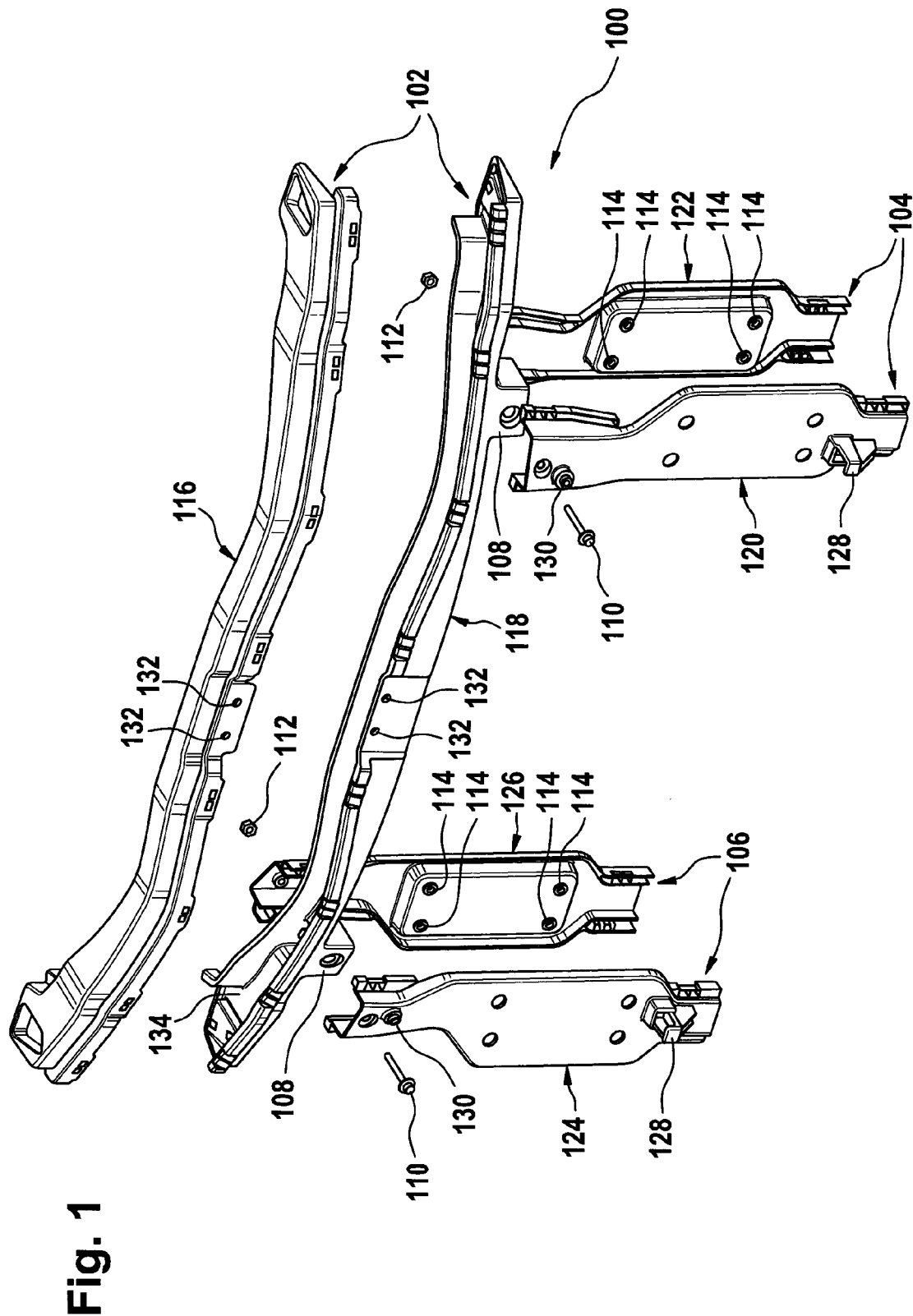
FIG. 1 shows an exploded view of an automotive front carrier according to an embodiment of the invention.

FIG. 1 shows an exploded view of an automotive front carrier 100 constructed using a horizontal cross member 102, a left hand vertical post 104 and a right hand vertical post 106. The horizontal cross member 102, the left hand vertical post 104, and the right hand vertical post 106, are all constructed using automotive front support beams according to an embodiment of the invention. The automotive front carrier 100 is located at the front portion of an automobile and is used for such things as mounting the radiator. The left hand vertical post 104 and the right hand vertical post 106 are named left and right hand according to the orientation of a driver or passenger seated in the automobile. The horizontal cross member 102 is constructed from a horizontal cross member top piece 116 and a horizontal cross member bottom piece 118. The left hand vertical post 104 is constructed from a left hand vertical post top piece 120 and a left hand vertical post bottom piece 122. In the case of the left and right hand vertical posts use of the term top and bottom piece does not imply a preferred orientation as these are vertical pieces. The term top piece and bottom piece are used solely to be consistent with the description in the claims of the automotive front support beam which is described as being constructed from a top piece and a bottom piece. Likewise the horizontal cross member 102 would not need to be constructed with a top piece and a bottom piece, the orientation of individual pieces could say be rotated by 90 degrees.

The right hand vertical post 106 is constructed from a right hand vertical post top piece 124 and a right hand vertical post bottom piece 126. The horizontal cross member bottom piece 118 has two protrusions 108. The top and bottom parts of the left hand vertical post 104 and the right hand vertical post 106 are designed to enclose a protrusion 108. When the protrusion 108 is enclosed in the hollow space of the vertical posts, this forms a rigid joint between the horizontal cross member 102 and the vertical post enclosing the protrusion 108. Additionally, there is a bolt 110 and a nut 112 which is used to additionally fasten this joint together.

The use of multiple molded pieces allows a great deal of detail to be molded into the pieces. For example in this figure we see a molded radiator mount 128. The radiator rests upon this structure. The radiator is then further secured using the threaded inserts 130. The threaded insert is molded into the vertical post. For additional mounting it can also be seen compression rings 114 which are molded into place.

From this figure it can also be seen that there would be a hollow space formed when these pieces are assembled. For instance the horizontal cross member bottom piece 118 has an inside area 134 which will form a hollow space when the horizontal cross member bottom piece 118 is assembled to the horizontal cross member top piece 116. These pieces are connected together using snap-fit connectors. The snap-fit connectors are visible in this diagram but are not marked as they will be discussed in more detail later. Support structures can also be incorporated into the hollow spaces. For instance holes 132 are visible in the horizontal cross member top piece and the horizontal cross member bottom piece. These holes 132 are for mounting a hood latch.

Figure 2:
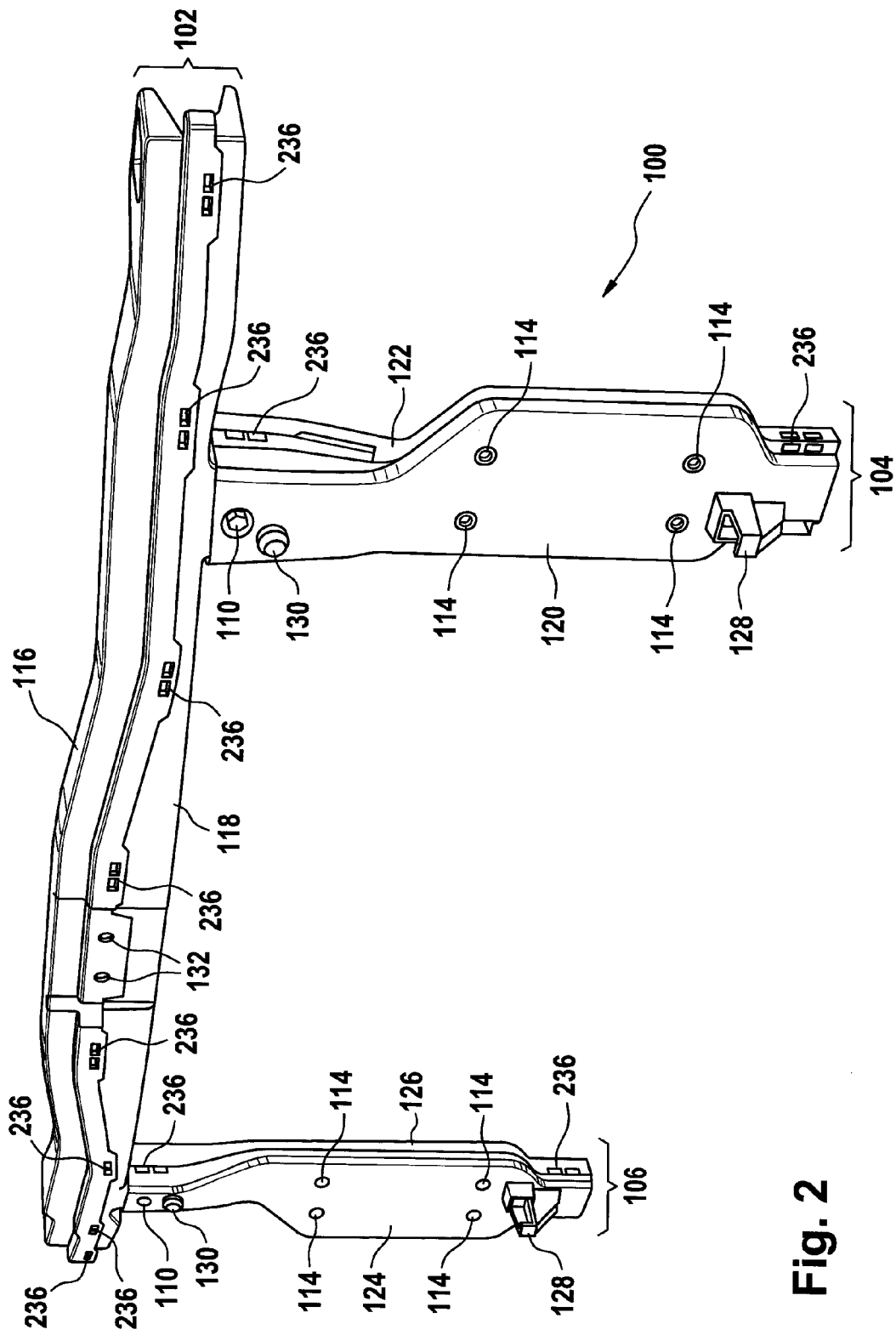
FIG. 2 shows the embodiment shown in FIG. 1 after assembly.

FIG. 2 shows the same embodiment as was shown in FIG. 1, except now the automotive front carrier 100 has been assembled. Additionally, the location where snap-fit connections 236 are made are labeled in this drawing. To assemble the pieces shown in FIG. 1, a press would be used to press the pieces together to form the snap-fit connections 236.

Figure 3:
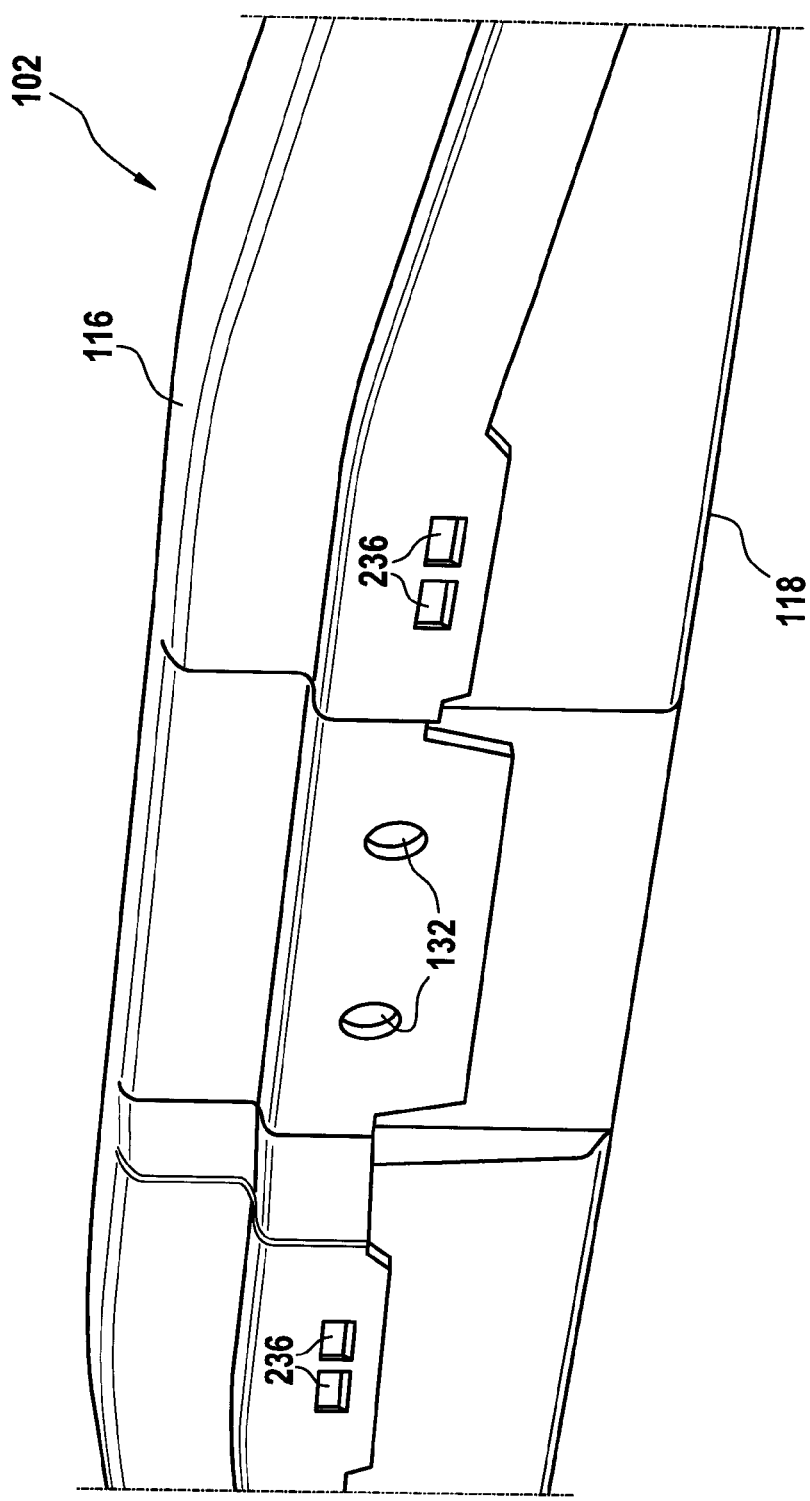
FIG. 3 shows a close up of the horizontal cross member of the embodiment shown in FIG. 1.

FIG. 3 shows a close up of the horizontal cross member 102. In this figure we see the horizontal cross member top piece 116 assembled to the horizontal cross member bottom piece 118. Holes for mounting a hood latch are also visible. In two places the location of the snap-fit connection 236 is also seen. There is a hollow space within the horizontal cross member 102. This figure illustrates how the hollow space provides for a place to put metal inserts for the latch reinforcement. The bolt for the latch reinforcement can protrude from the holes for mounting the hood latch 132. In addition the hollow space of the horizontal cross member 102 could also accommodate space for twintex or fiber type reinforcements. This is advantageous because they can be placed inside the hollow space and there is no need for trimming them. If the insert for the latch reinforcement is mounted within the hollow space also, there is no need to trim the edges of the insert because it is enclosed completely within the molded pieces that form the horizontal cross member 102. A hydro-form front-end structure could also be enclosed within the hollow space of the horizontal cross member 102.

Figure 4:
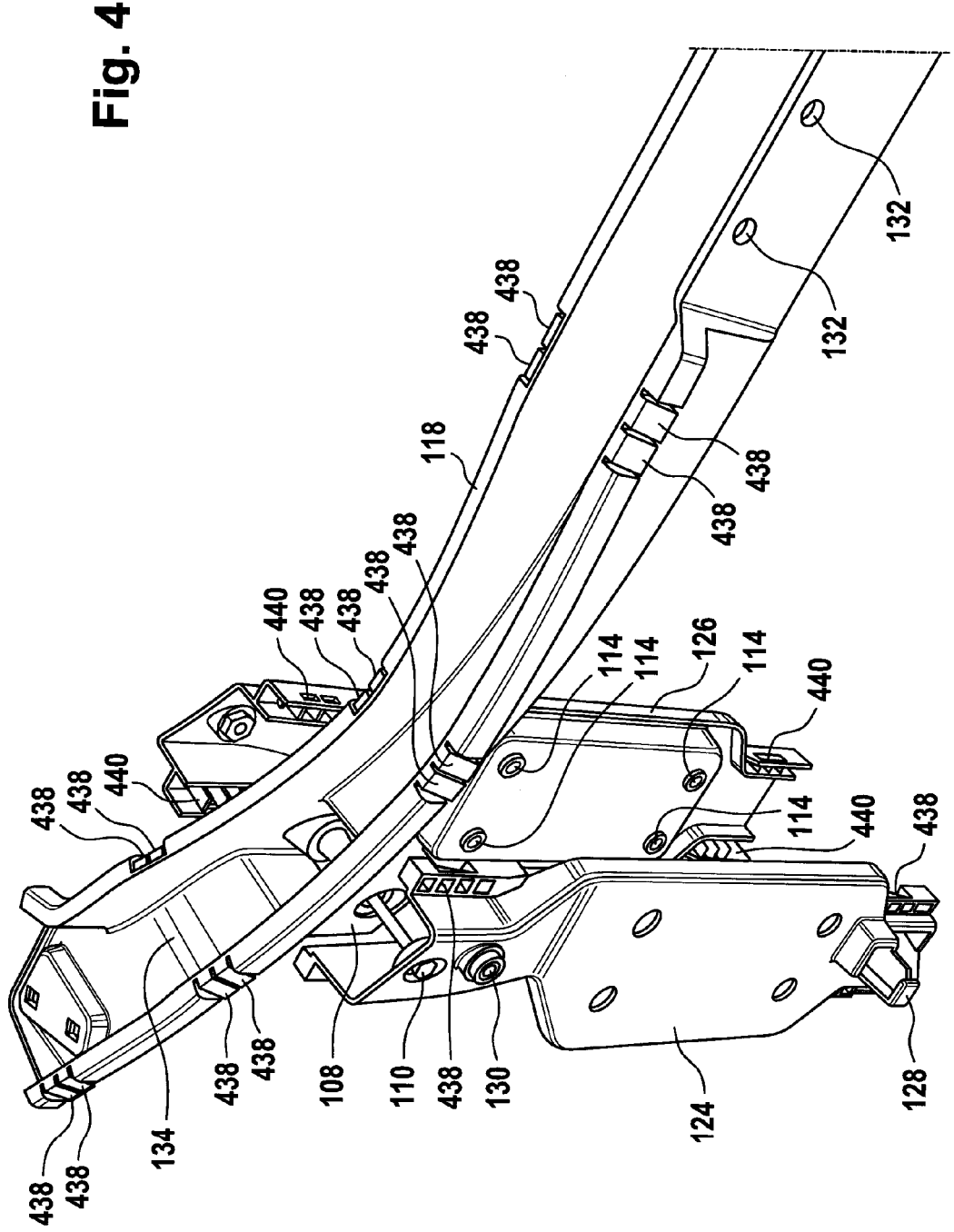
FIG. 4 shows a close-up exploded view of the horizontal cross member bottom of the embodiment shown in FIG. 1.

FIG. 4 shows a close-up exploded view of the horizontal cross member bottom piece 118 and the right hand vertical post top piece 124 and bottom piece 126. This figure shows in greater detail how the right hand vertical post top 124 and bottom 126 pieces are assembled around the protrusion 108 of the horizontal cross member bottom piece 118. In addition tabs 438 used for forming the snap-fit connection and openings 440 used for forming the snap-fit connection are also shown in this figure.

Figure 5:
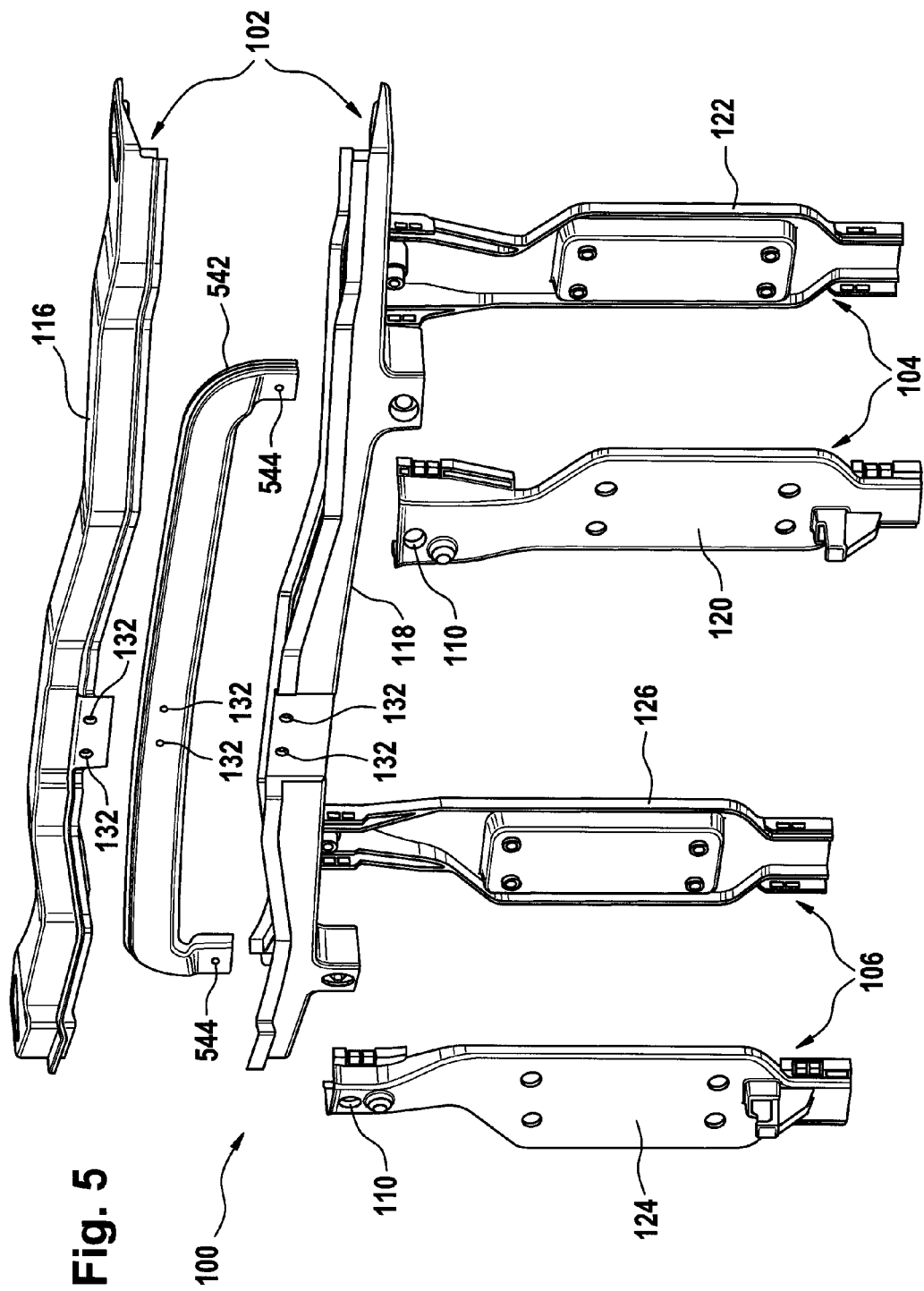
FIG. 5 shows an exploded view of an automotive front carrier according to a further embodiment of the invention.

FIG. 5 shows the automotive front carrier 100 shown in the previous figures This figure shows an exploded view of the automotive front carrier 100. In this figure a bridging stiffener 542 is shown. The bridging stiffener 542 forms an additional support which is enclosed within the hollow space of the horizontal cross member. There are holes 132 in the horizontal cross member top piece 116, horizontal cross member bottom piece 118 and bridging stiffener 542 which all line up and are holes 132 for mounting the hood latch. Additionally, the bridging stiffener 542 has additional holes 544 which are for accommodating the bolt 110 which is used in the assembly of the left 104 and right 106 hand vertical posts to the horizontal cross member 102. Such a bridging stiffener 542 can be constructed from a hydro-form support structure, made from a metal plate or stamped metal plate. It can also be made from a plastic or a composite material. In the embodiment shown in FIG. 5 there are no clips or opening for a snap-fit on the horizontal cross member top piece or the horizontal cross member bottom piece 118. In this case the horizontal cross member top piece 116 and the horizontal cross member bottom piece 118 are welded together.

Figure 6:
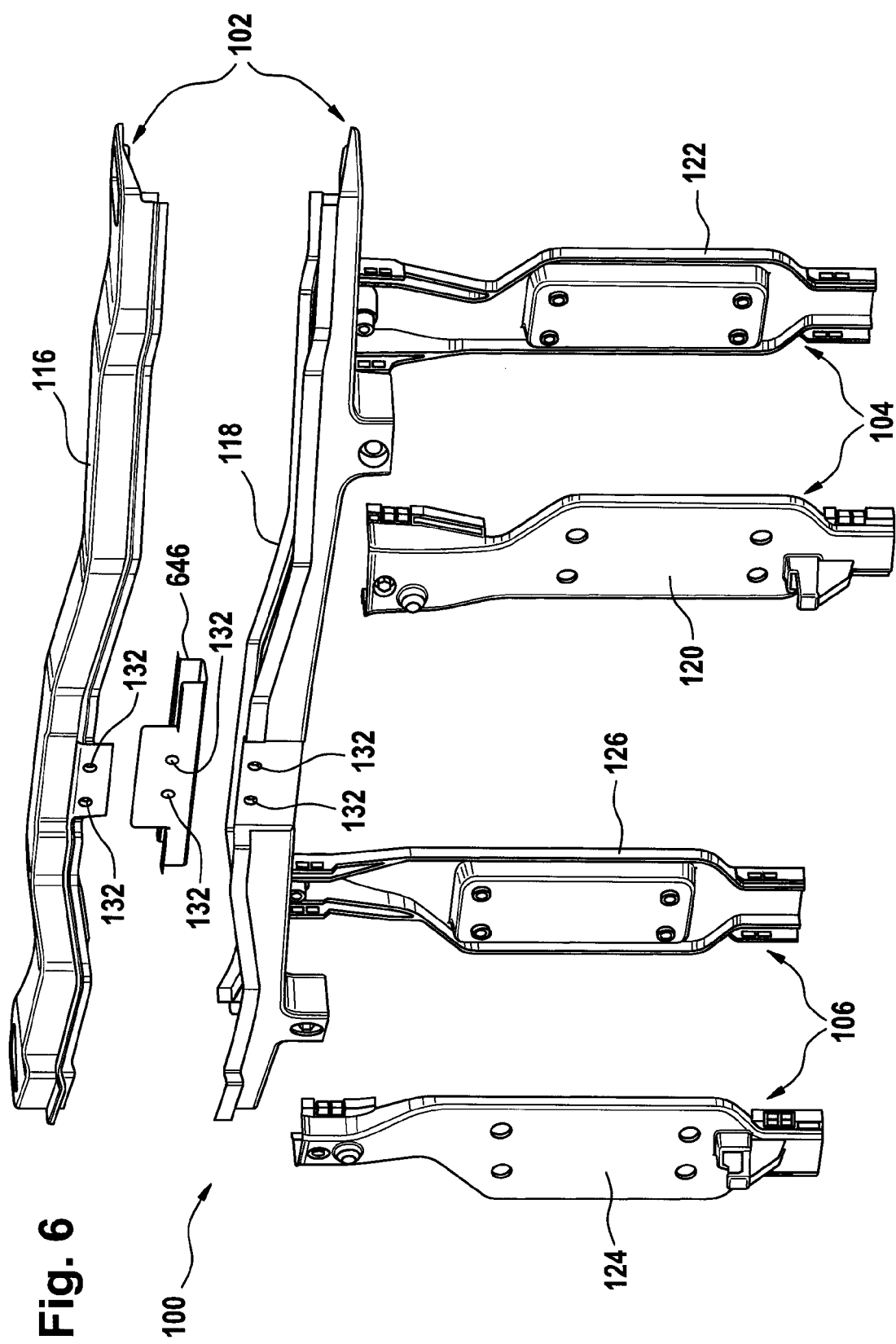
FIG. 6 shows an exploded view of an automotive front carrier according to a further embodiment of the invention.

FIG. 6 shows the same embodiment of the automotive front carrier 100 as was shown in FIG. 5. The horizontal cross member top piece 116 and the horizontal cross member bottom piece 118 are assembled by welding in this case also. Instead of the bridging stiffener 542 shown in FIG. 5, there is a local stiffener 646 instead. Again, there are holes 132 on the horizontal cross member top piece 116, the horizontal cross member bottom piece 118 and a local stiffener 646 which line up when the horizontal cross member 102 is assembled. The local stiffener 646 provides additional mechanical stability for the area where the mounting hood latch is mounted. FIGS. 5 and 6 show together that the choices for reinforcing within the hollow spaces of the automotive front carrier 100 are varied and engineers have a great degree of design choice.

Figure 7:
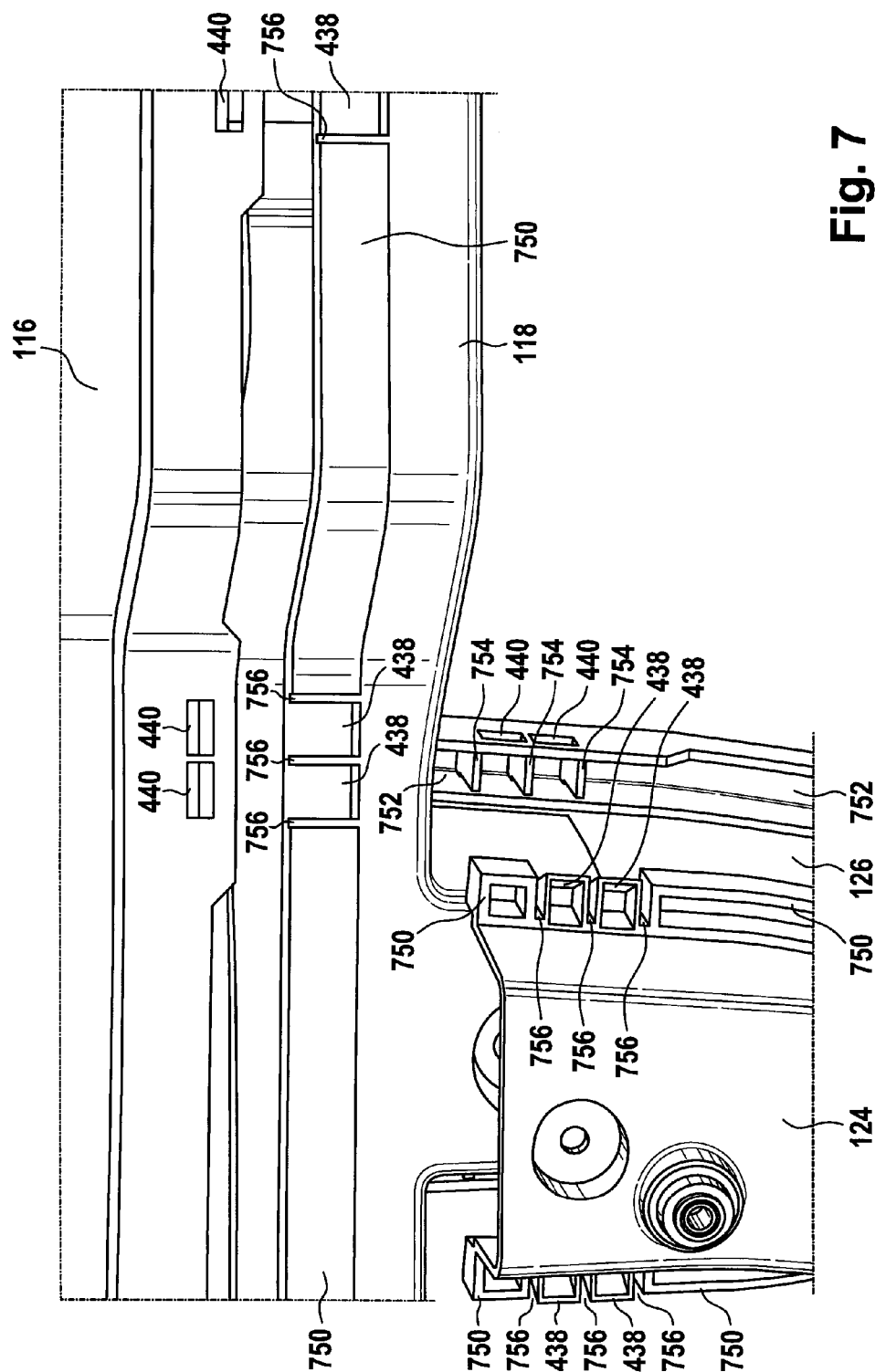
FIG. 7 shows an exploded view of an automotive front carrier according to a further embodiment of the invention in order to illustrate the snap-fit connectors.

FIG. 7 is an exploded view of an automotive front carrier. In this figure the horizontal cross member top piece 116, the horizontal cross member bottom piece 118, the right hand vertical post top piece 124 and the right hand vertical post bottom piece 126 are visible. The purpose of this figure is to help illustrate the functioning of the snap-fit connection. In this view the pieces are shown before the snap-fit is assembled. For the snap-fit there are openings 440 in one piece and tabs 438 in the other piece. For the snap-fit there are at least two tabs 438 adjacent to each other. In between the tabs are inter-tab spaces 756. There is also a stabilizing rim 750 located adjacent to the tabs 438. There is also an inter-tab space 756 between the tab and any adjacent stabilizing rim. The tabs 438 are designed to snap-fit into the openings 440. To provide additional mechanical stability there are spacers 754 which are adapted for filling the inter-tab space 756. In addition the holes 440 are cut into a stabilizing channel 752. This channel is filled by a stabilizing rim 750. The spacers 754 and the stabilizing channel 750 are designed such that they fill the inter-tab space 756 and the stabilizing channel 752 to a predetermined tolerance. The snap-fit connection holds the pieces together, but the spacers 754 and the stabilizing rim provide mechanical stability and rigidity. Without the spacers 754 and the stabilizing rim 750 the joins would not be as stable as they are.

Figure 8:
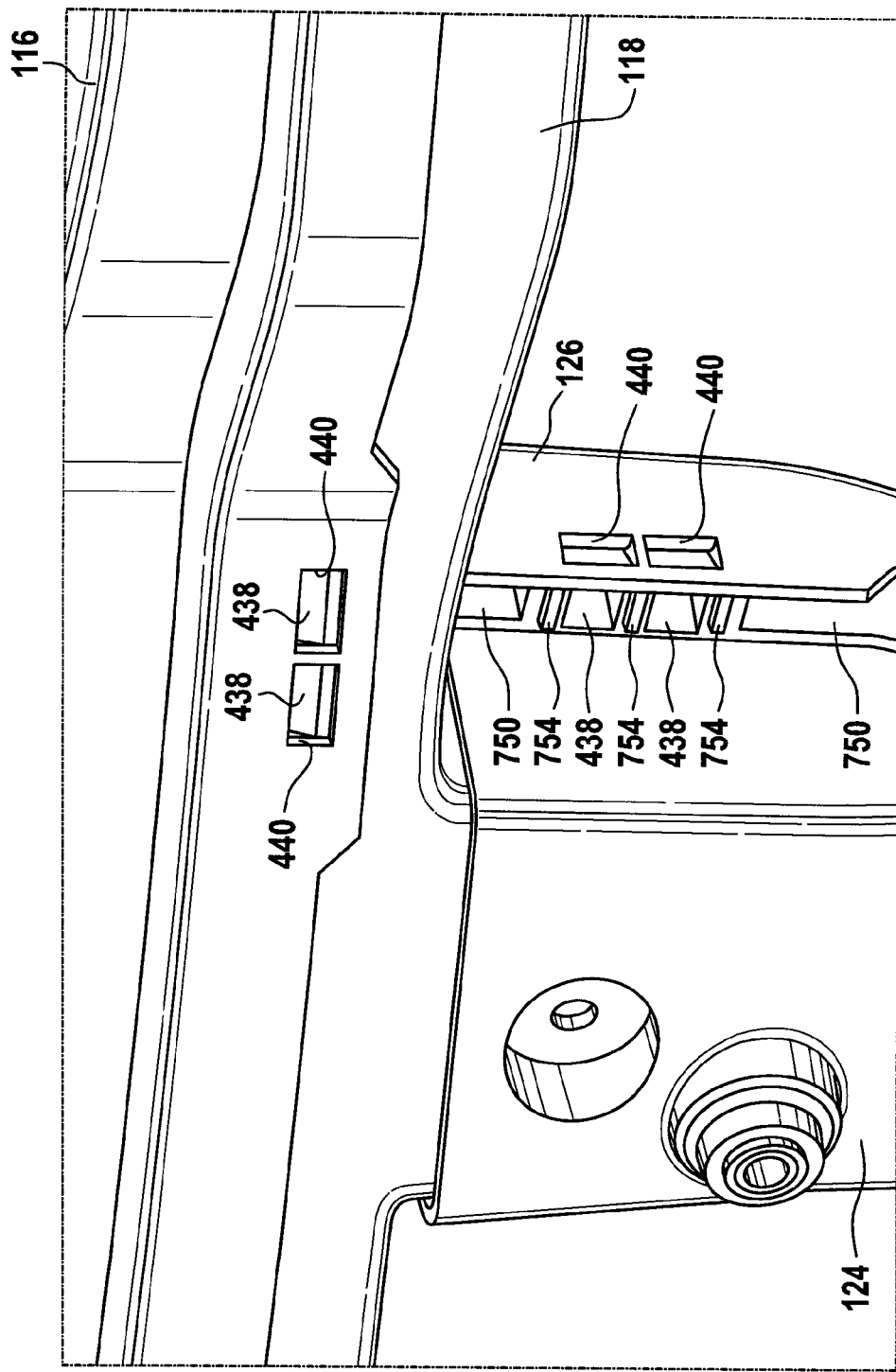
FIG. 8 shows the embodiment shown in FIG. 7 after assembly.

FIG. 8 shows the same components that were shown in FIG. 7 but now they have been assembled. The tabs 438 are visible through the openings 440 for the snap-fit connections. Additionally we can see how the spacers 754 fit between the tabs 438 and between tabs 438 and the stabilizing rim 750. It is also shown how the stabilizing rim 750 fits into the stabilizing channel 752. However, the stabilizing channel is not visible because it is filled by the stabilizing rim 750.

Figure 9:
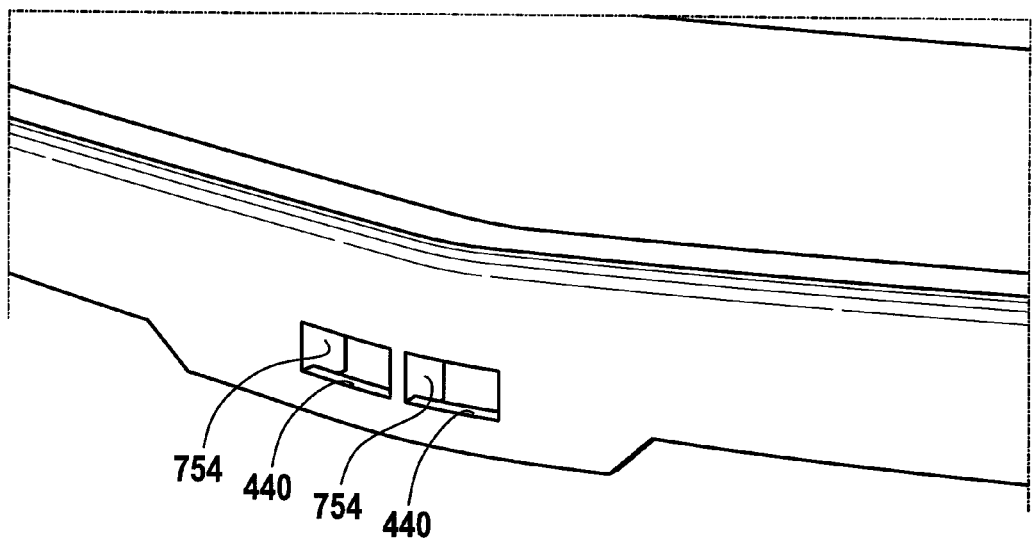
FIG. 9 shows a close up view of an embodiment of openings for the snap-fit connection.

FIG. 9 shows a further example of how the snap-fit connection is constructed. In FIG. 9 is shown openings for the snap-fit connection 440 and as this is a perspective view also are visible two spacers 754 used for forming the snap-fit connection. The stabilizing channel 752 is not visible due to the perspective view.

Figure 10:
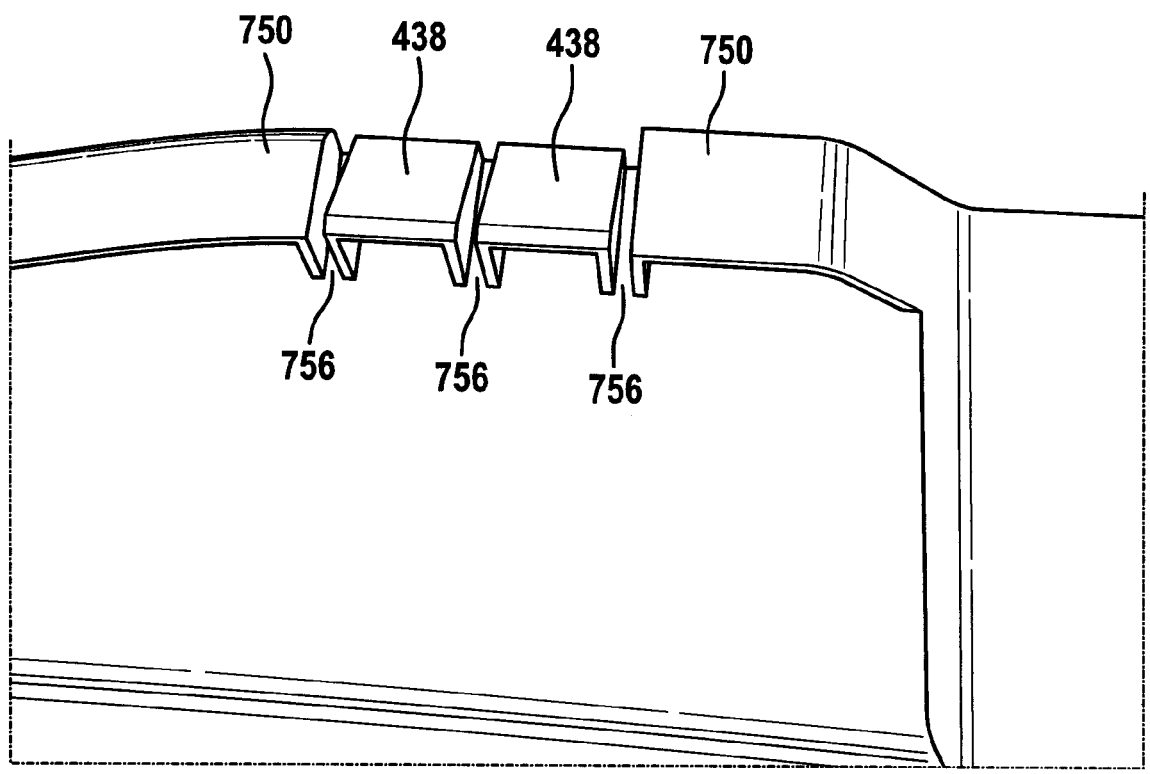
FIG. 10 shows a close up view of an embodiment of tabs for the snap-fit connection.

FIG. 10 shows a piece that would mate into the piece shown in FIG. 9. Here we see two tabs 438 which are adapted to go into an opening. In between there are inter-tab spaces 756 between the two tabs 438 and between the tabs 438 and the stabilizing rim 750. Also shown in this figure are the stabilizing rims 750. The stabilizing rims fit into the stabilizing channel of the mating piece.

Figure 11:
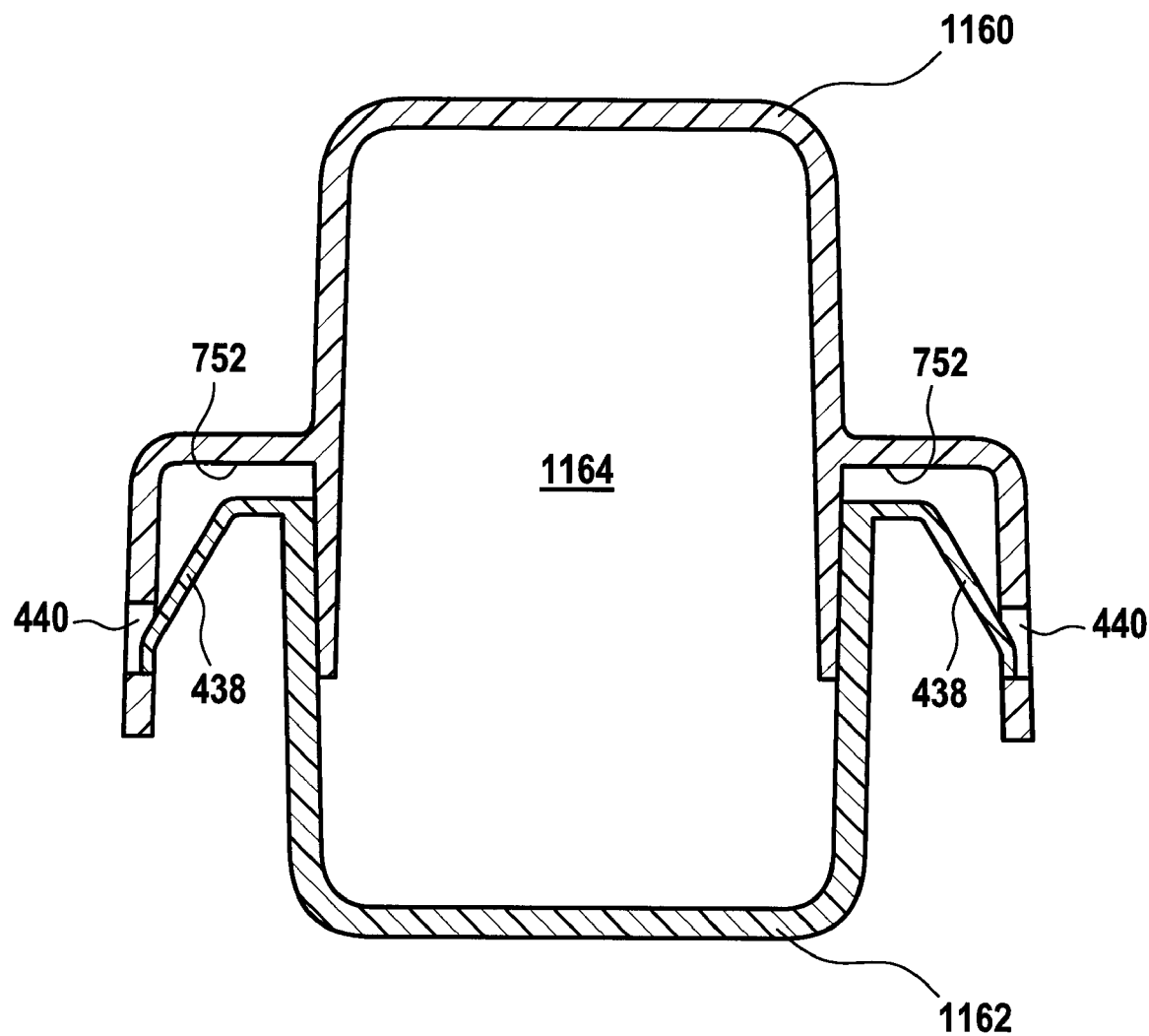
FIG. 11 shows a cross-sectional view of a snap-fit between a top piece and a bottom piece of an automotive front support beam according to an embodiment of the invention.

FIG. 11 shows a cross-sectional view of a snap-fit between a top piece 160 and a bottom piece 162 of an automotive front support beam. The top piece 1160 and the bottom piece 1162 are assembled. There is a hollow space 1164 visible in the interior of the assembled piece. The bottom piece has tabs 438 which are shown extending into openings 440 which have been cut into the top piece 1160. In addition a top piece has stabilizing channels 752.

Figure 12:
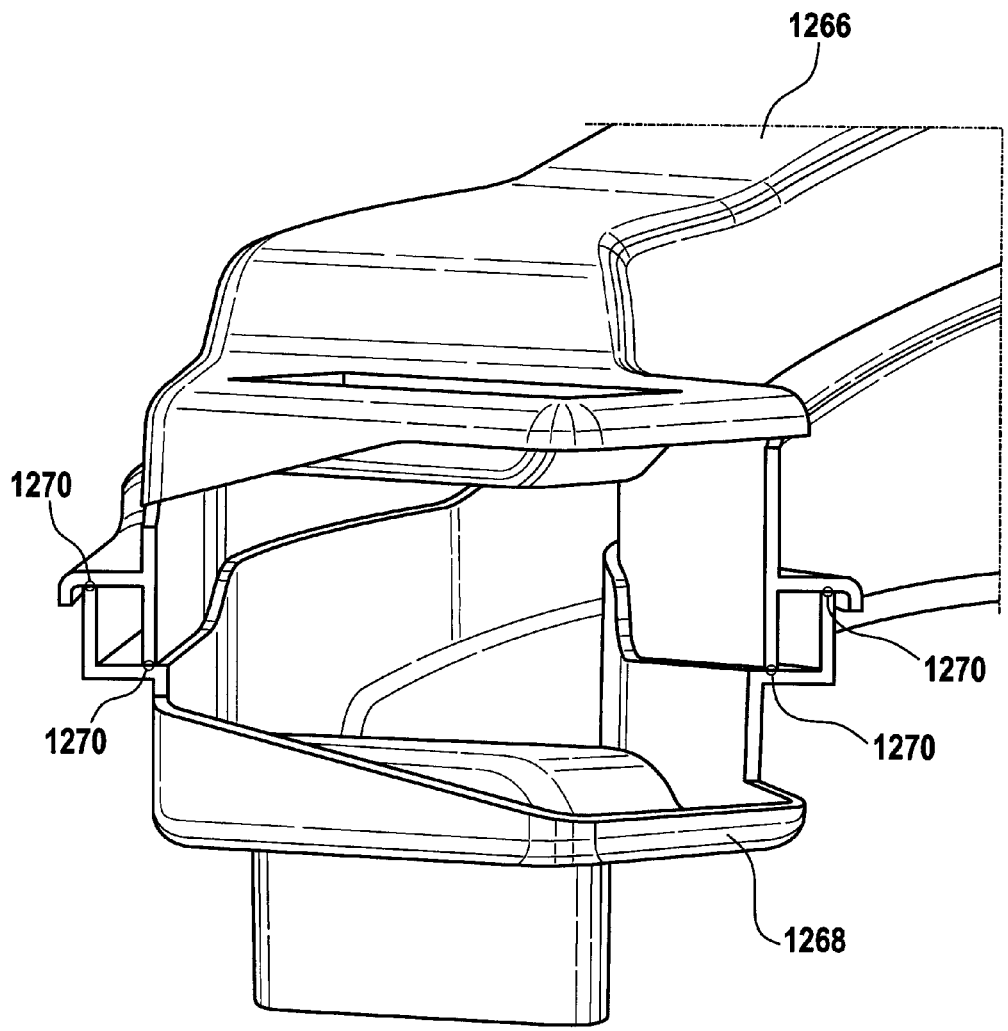
FIG. 12 shows an embodiment of a top piece and a bottom piece of an automotive front support beam according to the invention.

FIG. 12 shows a top piece 1266 and a bottom piece 1268 of an automotive front support beam. In this embodiment the top piece 1266 and the bottom piece 1268 are not snap-fit together. In this case the top piece 1266 and the bottom piece 1268 are welded together. The points labeled 1270 in this cross-section show where the top piece 1266 would be welded to the bottom piece 1268.

Figure 13:
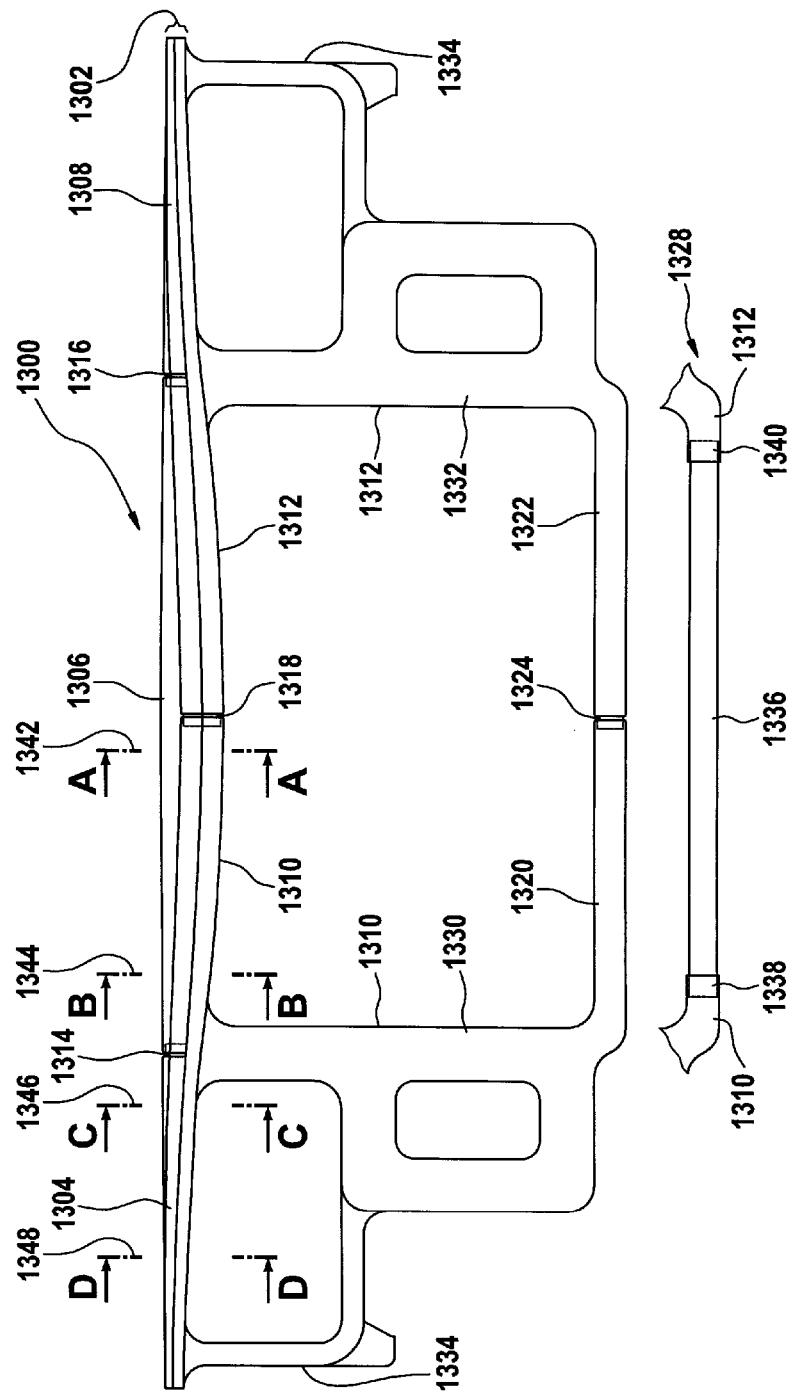
FIG. 13 shows an embodiment of an automotive front carrier where the horizontal cross member comprises five pieces.

FIG. 13 shows an embodiment of an automotive front carrier 1300 where the horizontal cross member 1302 comprises five pieces. The horizontal cross member 1302 is constructed using an embodiment of an automotive front support beam according to an embodiment of the invention. The top piece of the automotive front support beam comprises a right top piece 1304, a middle top piece 1306 and a left top piece 1308. The bottom piece of the automotive front support beam comprises a right bottom piece 1310 and a left bottom piece 1312. The right top piece 1304 can be slideably mounted to the top center piece 1306. There is a slideable joint 1314 between the right top piece 1304 and the middle top piece 1306. Similarly the left top piece 1308 can be slideably mounted to the middle top piece 1306. There is a slideable joint 1316 between the left top piece 1308 and the middle top piece 1306. The right bottom piece 1310 is slideably mountable to the left bottom piece 1312. There is a slideable joint 13*a* between the left bottom piece 1312 and the right bottom piece 1310. Furthermore, the top piece and the bottom piece are also slideably mounted. This is not shown in this figure however. The purpose of the slideable mounts between the various top pieces and the various bottom pieces is the ability to trend set assemble the automotive front carrier. The bottom dimensions and the top dimensions of the automotive front carrier are adjustable and can be adjusted to other parts which an auto manufacturer is assembling into an automobile.

In this embodiment the right vertical post 1330 is a part of the bottom piece 1310 and the left vertical post 1332 is a part of the left bottom piece 1312. In the embodiment shown in FIG. 13 the right bottom piece 1310 also has a right molded cross member. The left bottom piece 1312 also has a left molded cross member 1322. The right molded cross member 1320 and the left molded cross member 1322 are adapted to be slideably mounted. 1324 shows a slideable joint 1324 between the right molded cross member 1320 and the left molded cross member 1322. The right molded cross member 1320 and the left molded cross member 1322 add mechanical stability to the automotive front carrier 1300. Alternatively, there does not need to be a right molded cross member 1320 or a left molded cross member 1322. In another embodiment the right molded cross member 1320 and the left molded cross member 1322 are replaced with a cross member 1336. In this embodiment the right bottom piece 1310 is slideably mountable to the cross member 1336 and the left bottom piece 1312 is also slideably mountable to the cross member 1336. There is a slideable joint 1338 between the cross member 1336 and the right bottom piece 1310. There is a slideable joint 1340 between the cross member 1336 and the left bottom piece 1312. Also shown in FIG. 13 is an optional headlamp mount 1334. This is an additional molded piece attached to the right bottom piece 1310 or the left bottom piece 1312 for mounting a headlamp. Four cross sections are also indicated on FIG. 13. Cross section A is 1342, cross section B is 1344, cross section C is 1346 and cross section D is 1348.

Figure 14:
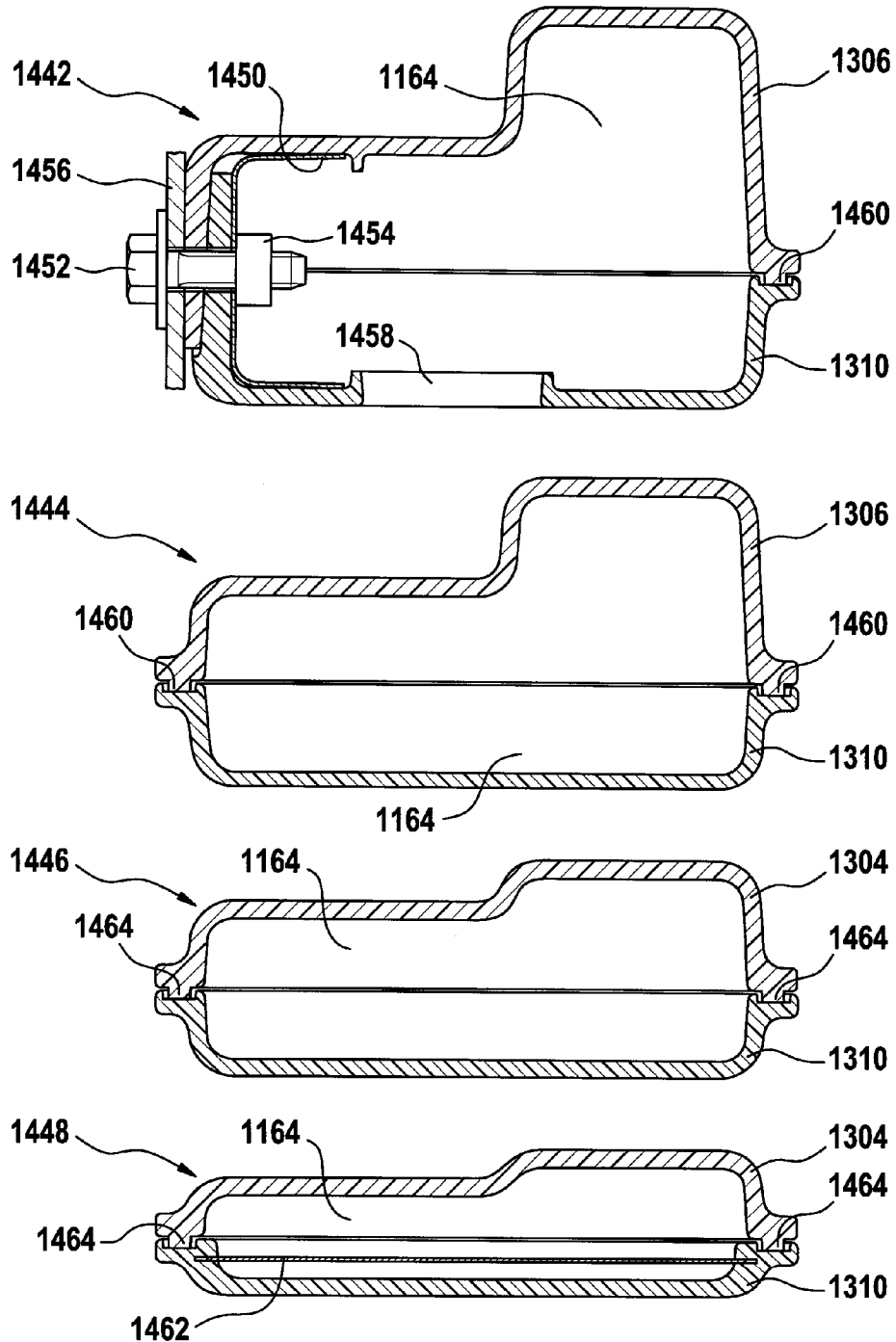
FIG. 14 shows cross sectional views of the horizontal cross member shown in FIG. 13.

FIG. 14 shows the four cross sectional views indicated in FIG. 13. 1442 shows a view of cross section A, 1444 shows a view of cross section B, 1446 shows a view of cross section C and 1448 shows a view of cross section D. In view 1442 the right top piece 1306 is shown above the middle top piece 1306 is shown above the right bottom piece 1310. In this view there is a metal stiffener 1450 and hood latch hardware 1456 shown. These are connected together using a bolt 1452 and a nut 1454. There is an access hole 1458 in the right bottom piece 1310 for assembling the bolt 1452 to the nut 1454. There is a slideable joint 1460 between the middle top piece 1306 and the right bottom piece 1310. In view 1444, the middle top piece 1306 is shown above the right bottom piece 1310. Also shown is a slideable joint 1460 between the right top piece, middle top piece 1306 and the right bottom piece 1310. In view 1446 the right top piece 1304 is shown on top of the right bottom piece 1310. There is a slideable joint 1464 between the right top piece 1304 and the right bottom piece 1310. In view 1448, the right top piece 1304 is shown above the right bottom piece 1310. There is also a slideable joint 1464 between the right top piece 1304 and the right bottom piece 1310. Additionally there is a metal stiffener 1462 shown in this view also.

Figure 15:
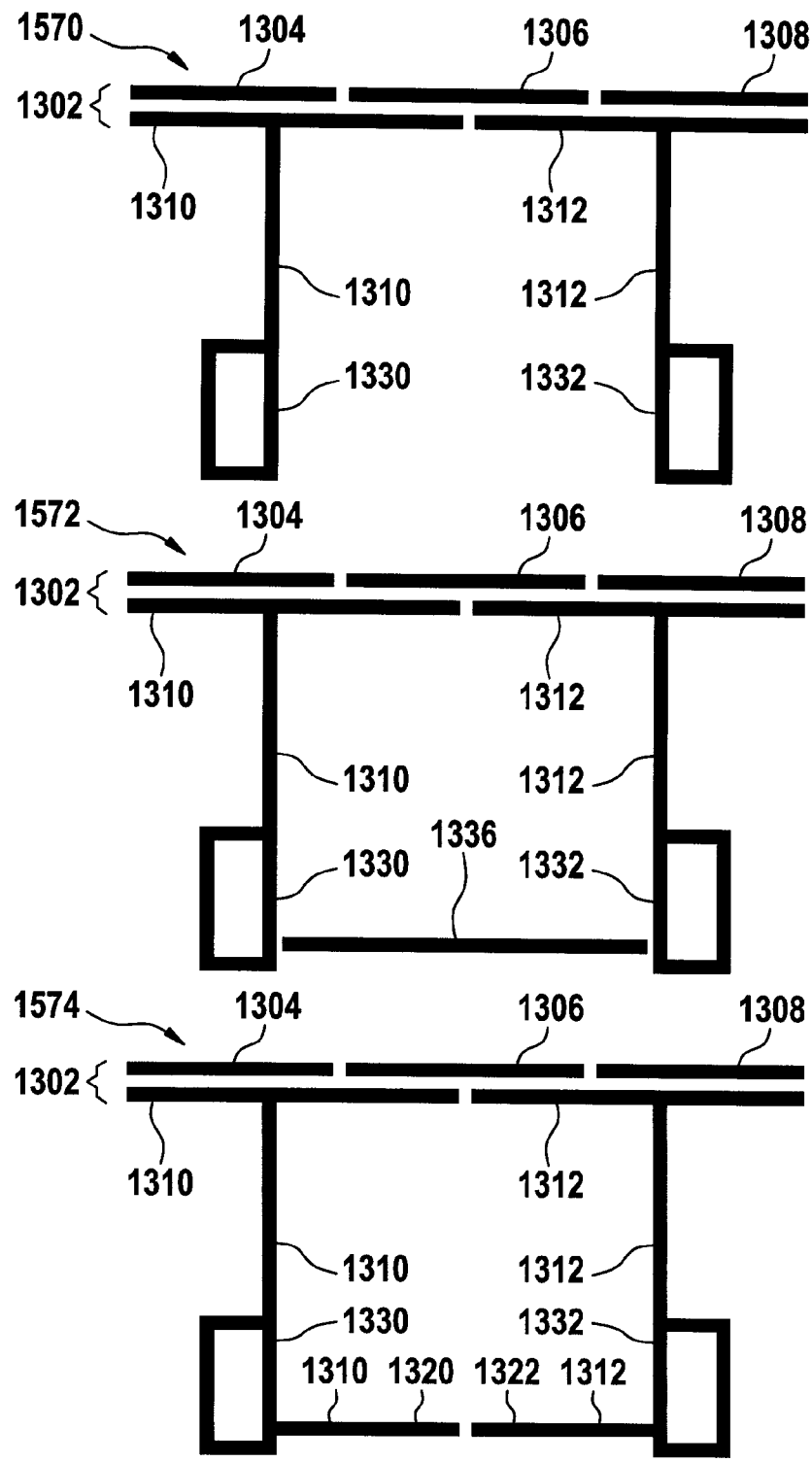
FIG. 15 shows idealized diagrams illustrating different versions of an automotive front carrier according to an embodiment of the invention.

FIG. 15 shows idealized diagrams of different versions of an automotive front carrier according to an embodiment of the invention. 1570 is the first idealized embodiment of the automotive front carrier. The horizontal cross member 1302 is made from an automotive front support beam according to an embodiment of the invention. The top piece of the automotive front support beam comprises three pieces and the bottom piece of the automotive front support beam comprises two pieces. The top piece comprises a right top piece 1304, a middle top piece 1306 and a left top piece 1308. The bottom piece comprises a right bottom piece 1310 and a left bottom piece 1312. These pieces are all slideable and mountable as was described in the embodiment of FIGS. 13 and 14. The right vertical post 1330 is shown as being a part of the right bottom piece 1310. The vertical post 1332 is shown as being a part of the left bottom piece 1312. The embodiment shown in view 1572 is very similar to the view shown in 1570 except a cross member 1336 has been added for additional mechanical stability. The embodiment shown in view 1574 is also very similar to the embodiment shown in embodiment 1570 except additionally there are molded cross members in this embodiment. In this embodiment a right molded cross member 1320 is a part of the right bottom piece 1310 and a left molded cross member 1322 is shown as being a part of the left bottom piece 1312.

Figure 16:
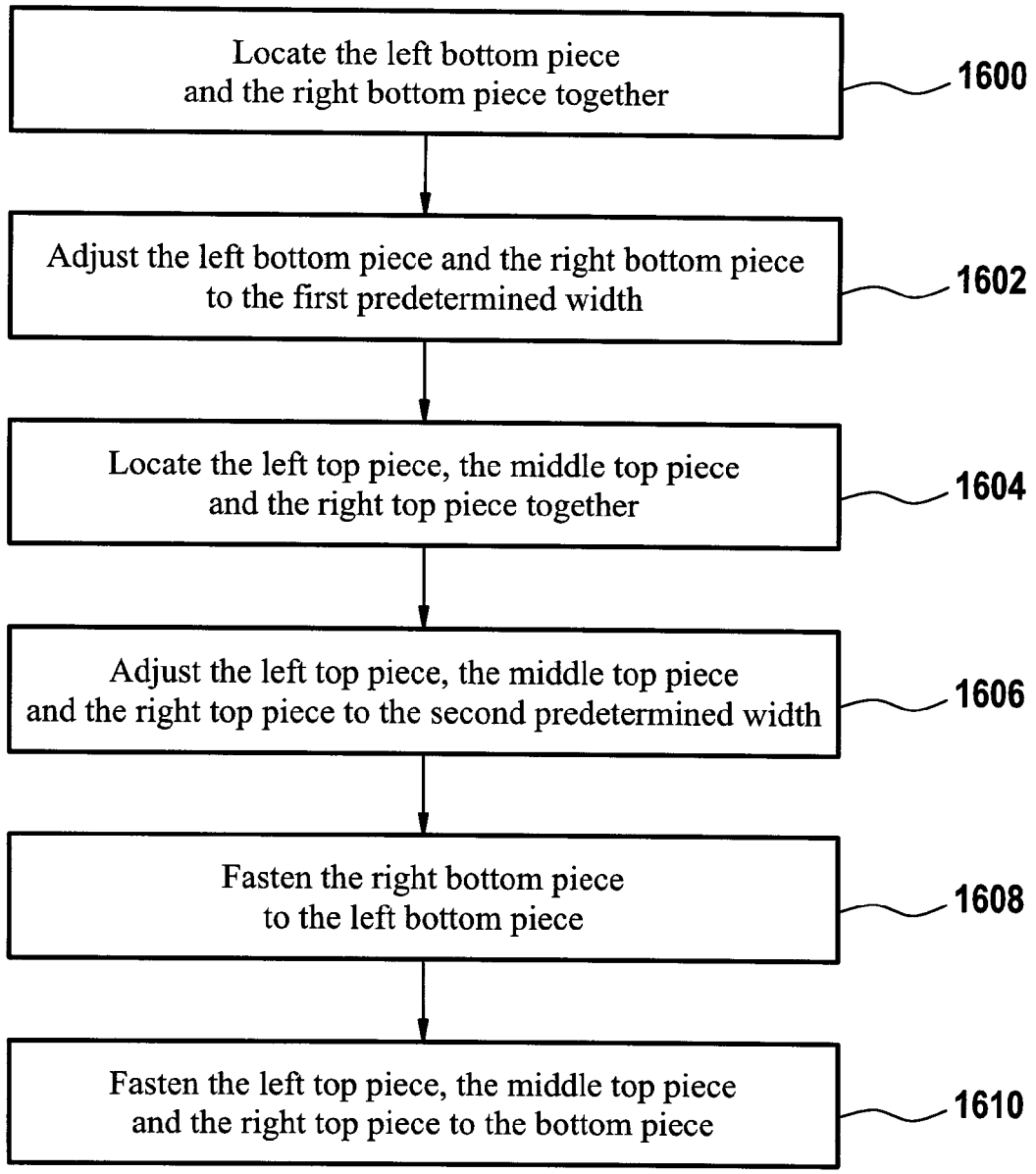
FIG. 16 shows an embodiment of a method for assembling an automotive front carrier.

FIG. 16 shows an embodiment of a method for assembling an automotive front carrier. This method is for trend set assembling the automotive front carrier. In step 1600 the left bottom piece and the right bottom piece are located together. It is understood that locating is assembling or mounting for the purpose of fastening together. In step 1602 the left bottom piece and the right bottom piece are adjusted to a first predetermined width. Next in step 1604 the left top piece, the middle top piece, and the right top piece are located together. In step 1606 the left top piece the middle top piece, and the right top piece are adjusted to a second predetermined width. I In step 1608 the right bottom piece is fastened to the left bottom piece. Finally in step 1610, the left top piece, the middle top piece and the right top piece are fastened to the bottom piece. The right bottom piece and the left bottom piece form the bottom piece.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LISTING OF REFERENCE NUMERALS

100 Automotive front carrier
102 Horizontal cross member
104 Left hand vertical post 106 Right hand vertical post
108 Protrusion
110 Bolt
112 Nut
114 Compression ring
116 Horizontal cross member top piece
118 Horizontal cross member bottom piece
120 Left hand vertical post top piece
122 Left hand vertical post bottom piece
124 Right hand vertical post top piece
126 Right hand vertical post bottom piece
128 Molded radiator mount
130 Threaded insert
132 Holes for mounting hood latch
134 Inside of horizontal cross member bottom piece
236 snap-fit connection
438 tabs for snap-fit connection
440 openings for snap-fit connection
542 bridging stiffener
544 hole
646 local stiffener
750 stabilizing rim
752 stabilizing channel
754 spacers
756 inter tab space
1160 top piece
1162 bottom piece
1164 hollow space
1300 Automotive front carrier
1302 horizontal cross member
1304 right top piece
1306 middle top piece
1308 left top piece
1310 right bottom piece
1312 left bottom piece
1314 slidable joint between right top piece and middle top piece
1316 slidable joint between left top piece and middle top piece
1318 slidable joint between left bottom piece and right bottom piece
1320 right molded cross member
1322 left molded cross member
1324 slidable joint between right molded cross member and left molded cross member
1328 view showing alternative to molded cross members
1330 right vertical post
1332 left vertical post
1334 optional headlamp mount
1336 cross member
1338 slidable joint between cross member and right bottom piece
1340 slidable joint between cross member and left bottom piece
1342 Cross section A
1344 Cross section B
1346 Cross section C
1348 Cross section D
1442 View of cross section A
1444 View of cross section B
1446 View of cross section C
1448 View of cross section D
1450 Metal stiffener
1452 Bolt
1454 Nut
1456 Hood latch hardware
1458 Access hole
1460 Slidable joint between middle top mpiece and right bottom piece
1462 Metal stiffener
1464 Slidable joint between right top piece and right bottom piece
1570 automotive front carrier
1572 Automotive front carrier with a cross member
1574 Automotive front carrier with molded left and right cross members

The invention claimed is:

1. An automotive front support beam for use in an automotive front carrier, wherein the automotive front support beam comprises:
a top piece; and
a bottom piece,
wherein the top piece and the bottom piece are fastened together and enclose a hollow space, and wherein the top piece and the bottom piece are molded, and
wherein the top piece and the bottom piece are fastened together via a snap-fit, which is formed by: (i) one of the top piece and the bottom piece having at least two tabs and a stabilizing rim, (ii) the other of the top piece and the bottom piece having at least two openings and a stabilizing channel, (iii) the stabilizing rim being adapted to fill the stabilizing channel within a first predetermined tolerance, (iv) the openings being adapted for receiving the tabs such that the tabs snap-fit into the openings and the number of tabs and the number of openings are identical,
wherein there is an inter tab space between each of the at least two tabs, and
wherein there are spacers mounted next to the openings which are adapted to fill the inter tab space to within a second predetermined tolerance when the snap-fit is made.

2. The automotive front support beam of claim 1, wherein the hollow space is adapted for enclosing at least one support structure.

3. The automotive front support beam of claim 2, wherein the support structure is any one of the following: a hydro-form support structure, a metal plate, an extruded stiffener, and a pulltruded stiffener.

4. The automotive front support beam of claim 1, wherein at least one of the top piece and the bottom piece is manufactured using direct long glass injection molding.

5. The automotive front support beam of claim 1, wherein at least one of the top piece and the bottom piece has at least one of the following molded features: a molded mounting structure and an insert.

6. The automotive front support beam of claim 1, wherein the hollow space is adapted for enclosing at least one of the following: a wire harness, a washer bottle, a radiator expansion bottle, and an electrical connector.

7. An automotive front carrier comprising:
at least one automotive front support beam having a top piece; and a bottom piece, and
a horizontal cross member comprising the automotive front support beam,
wherein the top piece and the bottom piece are fastened together and enclose a hollow space, and wherein the top piece and the bottom piece are molded, and
wherein the top piece and the bottom piece are fastened together via a snap-fit, which is formed by: (i) one of the top piece and the bottom piece having at least two tabs and a stabilizing rim, (ii) the other of the top piece and the bottom piece having at least two openings and a stabilizing channel, (iii) the stabilizing rim being adapted to fill the stabilizing channel within a first predetermined tolerance, (iv) the openings being adapted for receiving the tabs such that the tabs snap-fit into the openings and the number of tabs and the number of openings are identical, wherein there is an inter tab space between each of the at least two tabs, and wherein there are spacers mounted next to the openings which are adapted to fill the inter tab space to within a second predetermined tolerance when the snap-fit is made.

8. The automotive front carrier of claim 7, wherein the automotive front carrier comprises at least one vertical post, wherein the at least one horizontal cross member comprises the automotive front support beam.

9. An automotive front carrier, comprising:

at least one automotive front support beam having a top piece; and a bottom piece, and a horizontal cross member comprising the automotive front support beam, wherein the top piece and the bottom piece are fastened together and enclose a hollow space, and wherein the top piece and the bottom piece are molded, and wherein the top piece and the bottom piece are fastened together via a snap-fit, which is formed by: (i) one of the top piece and the bottom piece having at least two tabs and a stabilizing rim, (ii) the other of the top piece and the bottom piece having at least two openings and a stabilizing channel, (iii) the stabilizing rim being adapted to fill the stabilizing channel within a first predetermined tolerance, (iv) the openings being adapted for receiving the tabs such that the tabs snap-fit into the openings and the number of tabs and the number of openings are identical, wherein there is an inter tab space between each of the at least two tabs, and wherein there are spacers mounted next to the openings which are adapted to fill the inter tab space to within a second predetermined tolerance when the snap-fit is made, wherein the automotive front carrier comprises at least one vertical post formed from first and second pieces joined together and defining a further hollow space therebetween, wherein the horizontal cross member has a protrusion, wherein the first and second pieces of the vertical post are adapted for enclosing the protrusion between the further hollow space of the vertical post, and wherein the enclosing of the protrusion by the vertical post joins the horizontal cross member and the vertical post rigidly.

* * * * *